(12) United States Patent
Norman

(10) Patent No.: US 7,845,106 B2
(45) Date of Patent: Dec. 7, 2010

(54) AUTOMATIC FISHING JIGGING DEVICE AND FISHING ROD HOLDER

(76) Inventor: John B Norman, Box 507, 10731 Union Creek Rd., Lake George, CO (US) 80827

( * ) Notice: Subject to any disclaimer, the term of this patent is extended or adjusted under 35 U.S.C. 154(b) by 629 days.

(21) Appl. No.: 11/751,991

(22) Filed: May 22, 2007

(65) Prior Publication Data
US 2007/0266615 A1    Nov. 22, 2007

Related U.S. Application Data

(60) Provisional application No. 60/818,381, filed on Jul. 5, 2006, provisional application No. 60/802,280, filed on May 22, 2006.

(51) Int. Cl.
*A01K 97/10* (2006.01)
(52) U.S. Cl. ...................................................... 43/21.2
(58) Field of Classification Search .................. 43/19.2, 43/18.1, 21.2, 22, 15, 16, 17, 18.1 R; *A01K 97/10, A01K 97/11, 97/12*
See application file for complete search history.

(56) References Cited

U.S. PATENT DOCUMENTS

| | | | |
|---|---|---|---|
| 3,665,633 A * | 5/1972 | Scott | ........................... 43/19.2 |
| 4,251,939 A | 2/1981 | Tiede | |
| 4,420,900 A | 12/1983 | Nestor | |
| 4,581,840 A | 4/1986 | Guith, II | |
| 4,597,215 A | 7/1986 | Otremba | |
| 4,603,499 A | 8/1986 | Simborski | |
| 4,638,585 A | 1/1987 | Korte | |
| 4,660,317 A | 4/1987 | Evans | |
| 4,680,885 A | 7/1987 | Lindell et al. | |
| 4,700,501 A | 10/1987 | Bryan | |
| 4,779,371 A | 10/1988 | Braud | |
| 4,916,847 A | 4/1990 | Rusgo | |
| 4,951,411 A | 8/1990 | Ecker | |
| 5,036,616 A | 8/1991 | Wilsey | |
| 5,084,995 A | 2/1992 | Beaudoin | |
| 5,086,580 A * | 2/1992 | Redding | ...................... 43/21.2 |
| 5,119,580 A | 6/1992 | Schulte et al. | |
| 5,313,734 A * | 5/1994 | Roberts | ...................... 43/21.2 |
| 5,437,121 A | 8/1995 | Chacon, Jr. et al. | |
| 5,461,817 A | 10/1995 | Flood | |
| 5,473,835 A | 12/1995 | Emett | |
| 5,535,538 A | 7/1996 | Heuke | |
| 5,540,010 A | 7/1996 | Aragona | |
| 5,570,534 A | 11/1996 | Ford | |
| 5,638,628 A | 6/1997 | Davis | |
| 5,937,564 A * | 8/1999 | Perreault | ...................... 43/4.5 |

(Continued)

FOREIGN PATENT DOCUMENTS

JP      2001251999 A  *  9/2001

*Primary Examiner*—Son T Nguyen
*Assistant Examiner*—Shadi Baniani
(74) *Attorney, Agent, or Firm*—Leyendecker and Lemire; Kurt Leyendecker

(57) ABSTRACT

An automatic jigging device is described that utilizes a cam to move a fishing rod upwardly and downwardly in a manner based on fish behavior and psychology for a particular type of fish to increase the probability that a fish of the prescribed type will bite. Embodiments of a fishing rod holder are also described that can be used with the automatic jiggers or separately. The holder is adapted to lockably retain a fishing rod therein without the use of additional pieces.

2 Claims, 12 Drawing Sheets

U.S. PATENT DOCUMENTS

| | | |
|---|---|---|
| 6,009,656 A | 1/2000 | Knepp |
| 6,021,596 A | 2/2000 | Heuke |
| 6,088,945 A | 7/2000 | Sanderfoot |
| 6,282,830 B1 | 9/2001 | Henry |
| 6,363,650 B1 | 4/2002 | Beeler |
| 6,401,380 B1 | 6/2002 | McGonigal, Jr. |
| 6,415,543 B2 | 7/2002 | Keller |
| 6,564,496 B2 | 5/2003 | Scherg |
| 6,817,136 B2 | 11/2004 | Novak |
| 6,836,995 B1 | 1/2005 | Zernov |
| 6,920,714 B1 | 7/2005 | Modglin |
| 7,131,232 B1 * | 11/2006 | Fecht ........................ 43/21.2 |
| 7,210,263 B2 * | 5/2007 | Franke ...................... 43/19.2 |

* cited by examiner

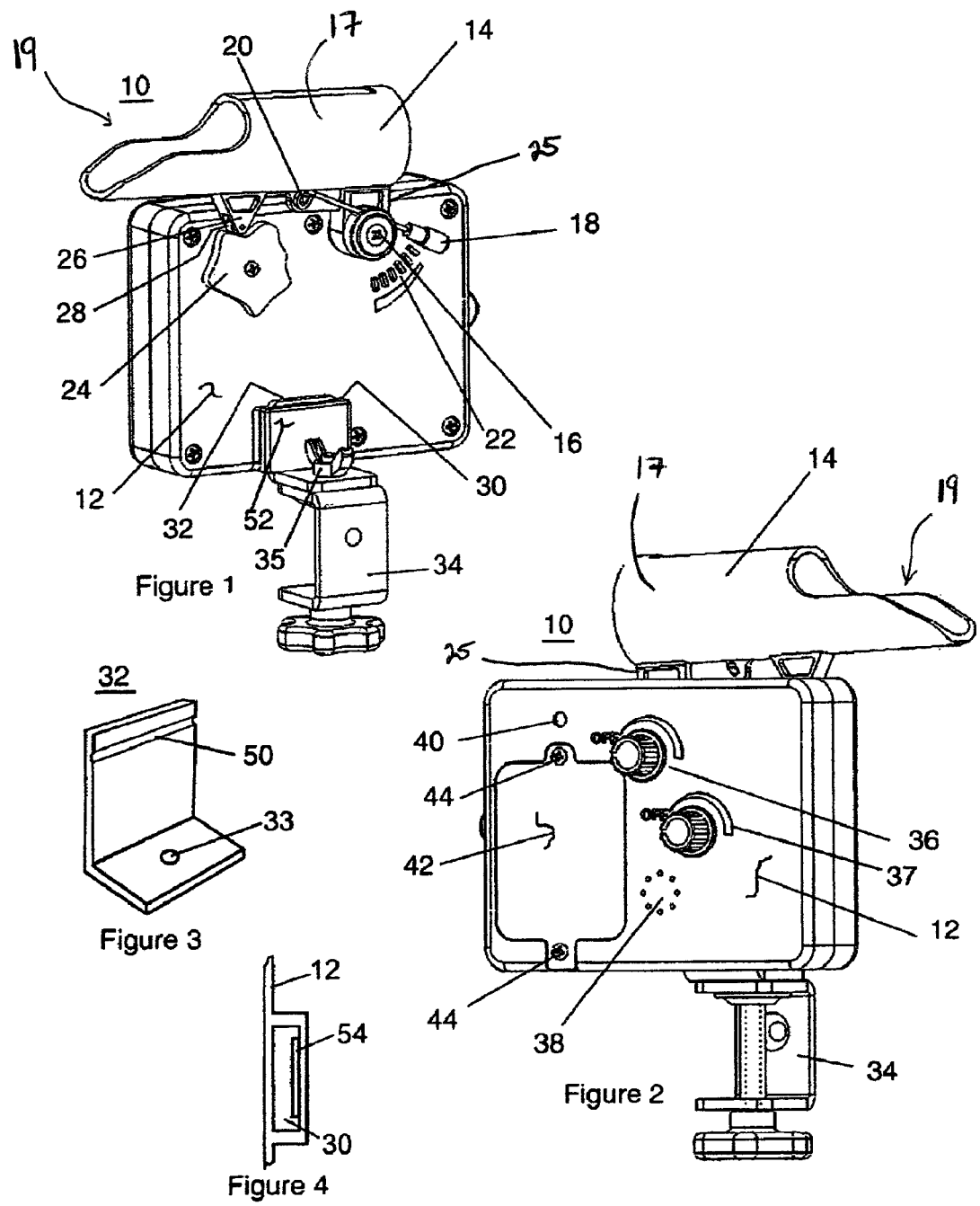

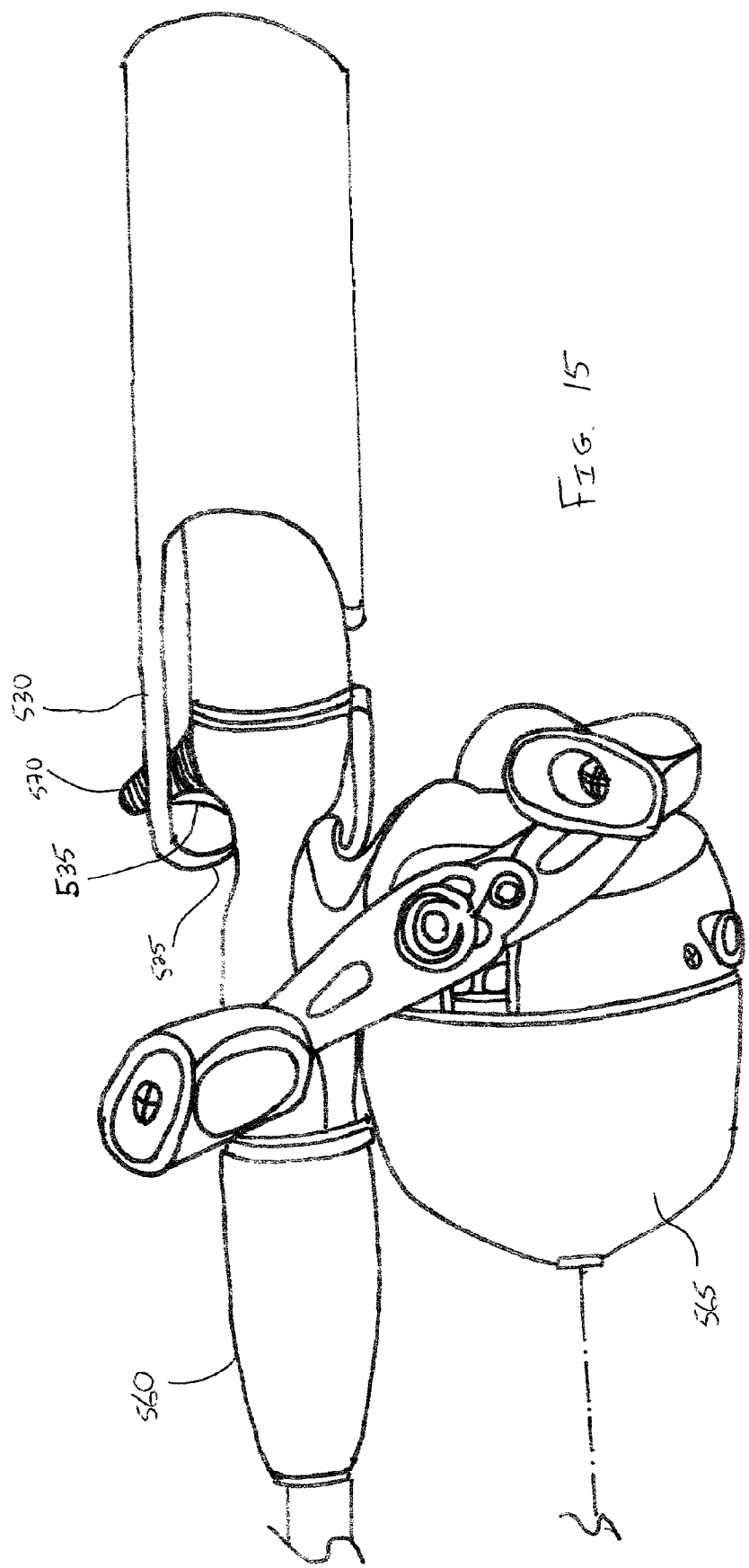

AUTOMATIC FISHING JIGGING DEVICE AND FISHING ROD HOLDER

RELATED APPLICATIONS

The present invention claims priority to provisional patent applications, Ser. Nos. (i) 60/818,381 filed on Jul. 5, 2006 entitled "Improved 'Open Lock' Fishing Rod Holder System"; and (ii) 60/802,280 filed on May 22, 2006 entitled "Cam Configuration for automatic jigging machines". Both provisional patent applications are also hereby incorporated by reference. Further, patent application Ser. No. 11/484,940 filed Jan. 18, 2007 is hereby incorporated by reference in its entirety.

FIELD OF THE INVENTION

The present invention relates generally to the field of fishing devices and fishing aids.

BACKGROUND

Fishermen are constantly looking for new ways to optimize the art of catching fish. One method of enticing fish to strike is called jigging. Jigging is the movement of a fishing rod in such a manner as to cause the lure or bait attached at the end of the line to move in such a way as to attract fish and cause them to strike. Dock, ice, boat and bank fisherman often use more than one fishing rod and reel. Since the fisherman can only jig with one or at most, two rods at a time, being able to jig additional rods automatically offers a great advantage. A number of attempts have been made to create an automatic jigging device, but they have all suffered from one deficiency or another.

For instance, many of the previous devices require large batteries such as a car battery or they don't alert a user that a fish is on the line and the motor of the device burns out.

Also, these prior art automatic jiggers are not typically adapted to jig the rod in a specific rhythm that is most likely to land the particular type of fish a fisherman is seeking. Specifically, prior art jigging machines tend to move a fishing rod in repeating up and down motions having substantially similar amplitudes at a constant cadence. For instance, a prior art device may move the rod up and down over a set distance over a constantly repeating interval of time. In cam-based jiggers, the cam typically will have a single lobe or a plurality of substantially similar lobes distributed over the circumference of the cam. The frequency can often be changed by varying the speed of an associated motor but the amplitude of the movement cannot be varied.

Other types of automatic jiggers move the fishing line seemingly randomly. These automatic jiggers do not tend to use a cam based system. Some employ vibration, although with vibratory jiggers, the frequency and amplitude of the vibration tend to be fairly uniform for a given vibratory motor setting. At least one device relies upon wind (U.S. Pat. No. 6,817,136) to effect jigging movement. The jigging motion imparted by this device is completely at the whim of the ever-changing wind, giving a user little or no control over the nature of the jigging as might be desirable depending on the environmental conditions and type of fish being sought.

While the action of prior art jigging devices certainly attracts some fish, the majority of fish are unaffected by the predictable and monotonous rising and lowering of a lure, or bait. Further, the random motion jiggers do not permit a fisherman, any control over the jigging motion and depending on the fish being sought and the environmental conditions might even act to repel a fish rather than attract it towards the lure.

Another disadvantage of typical prior art jigging devices is that they do not permit or facilitate a user to adjust the jigging pattern other than perhaps by varying the speed of a motor to change frequency.

Further, prior art automatic jigging devices typically utilize rod holders that either lack the ability to lock or securely hold a fishing rod in place, such as illustrated in published U.S. Patent Application 2007/0011937, or the rod holders utilize lock rings that typically cannot be quickly operated to remove the rod as is necessary to set a hook when a fish bites.

Most prior art fishing rod holders, whether designed for use with an automatic jigger or fabricated for more traditional usage, are composed of a tubular piece of plastic or metal that the butt of the rod can be placed in. The rod holder is in a fixed or on an articulating base that supports the holder. In some instances, the rod holder also includes a system for locking the rod and reel in place to keep large fish from pulling the rod and reel out of the holder, and possibly into the water. Prior art locking systems are generally a second ring of plastic or metal that slides in a track and rotates around the shaft of the rod holder. A section of the ring is open and thus when the ring is rotated around the ring of the holder to an solid area of the ring, the rod and reel are now under the ring and locked in place. The rod can be removed from the holder by rotating the ring to the open position on the shaft over the rod. Often however, anglers have to rotate the ring to the open position and pull the rod out of the rod holder when a fish bites to attempt to "set the hook". In many instances, the fish has spit out the hook and has fled the area by the time the angler has released the rod from the holder. This can be especially problematic for anglers who are overly excited, have cold hands, have arthritis or are handicapped. Rotating a ring to unlock the rod may in many instances just take too much time. Paul Johnson author of the famous book: The Scientific Angler, estimates that, "most fishers loose 19 out of 20 fish that they have bites from". Many of these missed bites can be attributed to cumbersome locking mechanisms on contemporary prior art rod holders.

BRIEF DESCRIPTION OF THE DRAWINGS

FIG. 1 is a top left perspective view of a backside of an automatic jigging device in accordance with one embodiment of the invention;

FIG. 2 is a top left perspective view of a front-side of an automatic jigging device in accordance with one embodiment of the invention;

FIG. 3 is a top right perspective view of a vertical extension of a clamp in accordance with one embodiment of the invention;

FIG. 4 is a top view of a slot in a housing of an automatic jigging device in accordance with one embodiment of the invention;

FIG. 15 is an isometric top view of the fishing rod holder of FIG. 10 with a pistol grip rod and closed faced spinning reel combination lockably received therein according to one embodiment of the present invention.

DETAILED DESCRIPTION

Figure 5:
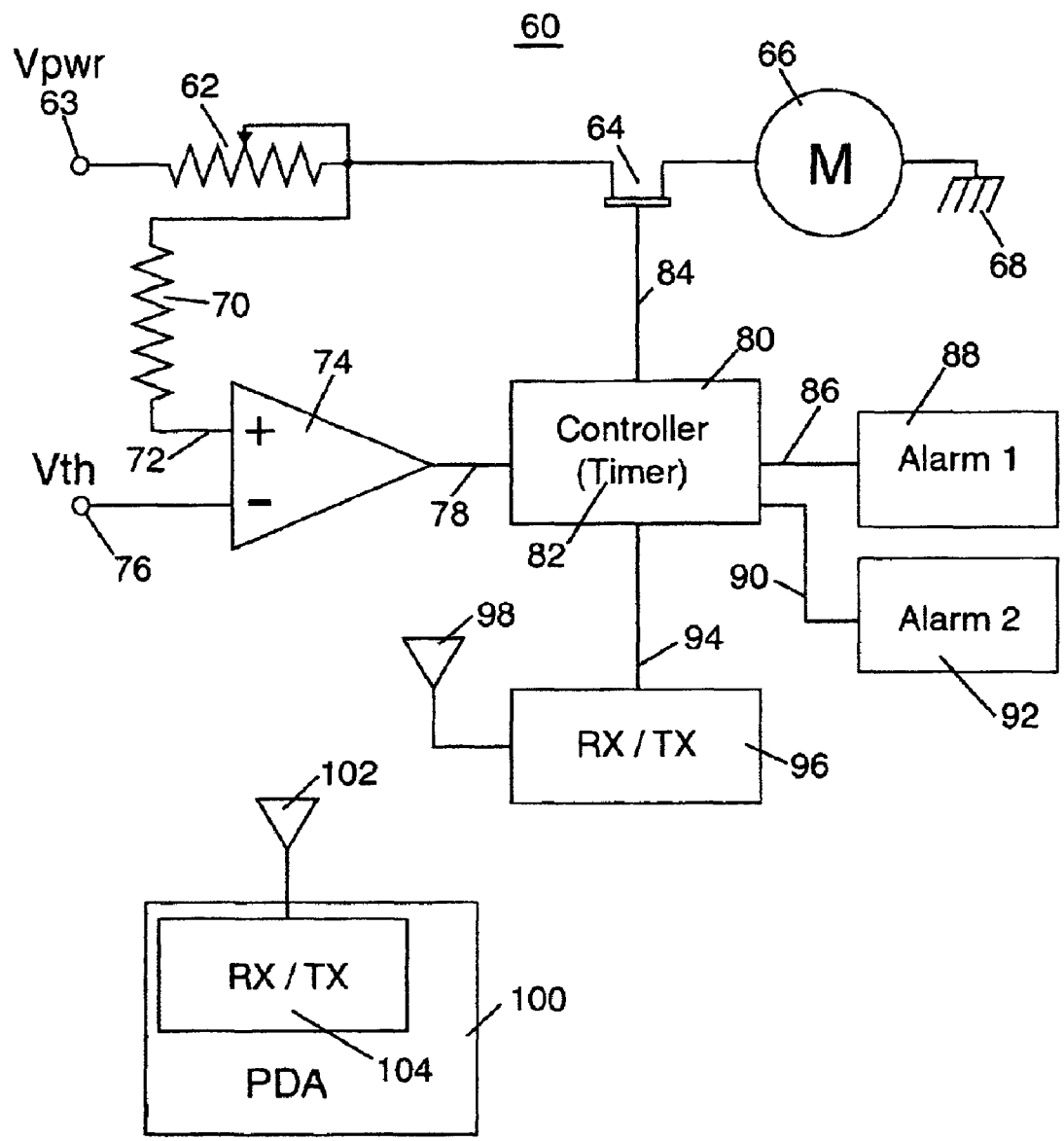
FIG. 5 is a circuit diagram of the circuit used in an automatic jigging device in accordance with one embodiment of the invention.

Embodiments of the present invention comprise an automatic jigging device for fishing that securely hold/locks a fishing pole in its associated holder but also permits a user to quickly and easily remove the pole from the holder once a fish has struck. Embodiments of the associated rod holder, which may be utilized in other applications apart from the automatic jigging machine, are adapted to lockably hold both pistol grip rods and rods designed for open faced spinning reels.

The rod holder typically comprises a single tubular piece (not including flanges and other elements or hardware to secure or clamp the holder in place) not requiring extraneous mechanisms or elements (such as lock rings) to securely hold a fishing rod in place. The design of embodiments of the rod holder permits a user to quickly remove the rod from the holder to facilitate effectively setting the hook before the fish has a chance to spit it out and leave the area. Accordingly, automatic jigging device embodiments utilizing the rod holder can accommodate most types of rod and reel combinations currently in use.

Other embodiments comprise an automatic jigging device that includes interchangeable cams of various profiles that cause the fishing rod to be jigged at different patterns. For instance one cam pattern may be provided for use when trying to catch aggressive fish and another pattern may be provided for use when trying to catch more passive fish. In at least one variation, a user may be provided with one or more blank cams (i.e. cams that are substantially round) from which he/she may carve his/her own jigging patterns for specific fishing conditions or to more accurately mimic a jigging pattern the fisherman has developed when manually jigging a rod.

Other embodiments of the jigging device that incorporate one or more of the features described above further include a mechanism that alerts a user when there is a strike or when a fish is on the line. One variation of such embodiments incorporates a current detector coupled to the motor that jigs the fishing rod holder. The current detector detects when the jigging motor draws more current to compensate for the additional load resulting from the fish strike as well as the hooked or partially hooked fish pulling on the line. When the current detector detects an increase in current draw above a certain or predetermined level, it activates an alarm, which may be an audible, visual or even comprise a wireless message. Other suitable alerts or combinations of alerts are contemplated as well.

In at least one embodiment, a processor or circuit (also referred to as a controller) turns off the jigging motor when the current draw has exceeded a threshold for a certain period of time. In other embodiments, the processor or circuit is configured to differentiate a fish strike from a fish that is hooked on the line and triggers different alarms for each condition. In some variations, after the motor has been off for a period of time as a result of an excessive current draw, the controller may include circuitry and logic to restart the motor. By limiting the permissible current draw of the motor: (i) the motor is protected overload damage; (ii) the amount of power used by the device is reduced compared to prior art devices; and (iii) the fisherman is alerted to a strike or when a fish on the line. Because of the reduced power consumption, the device can run for an extended period of time on ordinary AA-cell or batteries in other commonly available sizes.

Terminology

The term "or" as used in this specification and the appended claims is not meant to be exclusive rather the term is inclusive meaning "either or both".

References in the specification to "one embodiment", "an embodiment", "a preferred embodiment", "an alternative embodiment", "one variation", "a variations" and similar phrases mean that a particular feature, structure, or characteristic described in connection with the embodiment is included in at least an embodiment of the invention. The appearance of the phrase "in one embodiment" in various places in the specification are all not necessarily meant to refer to the same embodiment.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

An Embodiment of an Automatic Jigging Device

FIG. 1 is a top left perspective view of a backside of an automatic jigging device 10 in accordance with one embodiment of the invention. The device 10 has a housing 12 with a fishing rod holder 14 pivotally 16 connected to the housing 12 by way of an attachment flange 25 that extends downwardly from the bottom of the holder proximate its distal end. The holder includes a substantially cylindrical tubular portion 17 having a cutaway section 19 that extends inwardly from the proximal end of the tubular portion. A butt end of a fishing rod is received in the tubular portion via the proximal end and the cutaway portion. The tubular portion of the fishing rod holder illustrated in FIG. 1 is of the prior art variety in that the cutaway portion does provide any means for securing a fishing rod in place. Preferred variations incorporate an improved tubular holder as contemplated above and described in detail below that has an improved cutaway portion that effectively lockably retains fishing rods of pistol grip type rods and those adapted to accommodate open faced spinning reels. In other words, one significant difference between the holder illustrated in FIG. 1 (and FIG. 2) and an automatic jigging device incorporating the improved holder is the specific configuration of the cutaway portion.

An adjustable torsion spring 18 acts as a counter weight for the fishing rod. The torsion spring 18 connects between an eyelet 20 on the fishing rod holder 14 and a plurality of lips 22 on the housing of the device. Accordingly, the force applied by the spring to counter the weight of a particular fishing rod can be adjusted by moving an end of the spring between different slots.

A cam 24 is typically fixedly attached to the shaft of a motor (located within the housing) for rotation therewith. In variations, the cam may be operatively coupled to the motor by way of one or more gears, gear assemblies, cogs, chains, belts and/or pulleys. The cam 24 is in contact with a cam follower flange 26 that extends downwardly from the fishing rod holder 14 at a location forward of the attachment flange 25. The cam follower 26 typically includes a roller 28 that reduces the friction between the cam 24 and the cam follower 26.

The housing 12 has a vertical slot 30 that engages a vertical flange 32 of a clamp 34. The clamp 34 can be mounted to a boat handrail or a pier handrail or a number of other items. It is to be appreciated that the mechanism adapted for coupling the housing to a clamp can vary substantially as would be obvious to one of ordinary skill in the art given the benefit of this disclosure.

FIG. 2 is a top left perspective view of a front-side of an automatic jigging device 10 in accordance with embodiments of the invention. The jigging device 10 typically has a motor speed control 36 and a sensitivity control 37. A speaker 38 is provided and is adapted to alert the user if (i) a fish strikes the bait attached to a hook or lure that is operatively coupled by a line to a rod contained in the holder 14 or (ii) a fish is hooked on the line. The sensitivity control 37, which effectively controls the permissible current loading of the motor, determines how big a strike or fish sets off the alarm. A light 40 may also be provided to alert the user if a fish strikes the hook or lure or is on the line. A battery compartment 42 is typically accessible by removing screws 44 or as in at least one variation, the screws hold rotatable flanges that are rotated to provide access to the batteries. The batteries provide power for the motor, speaker 38, light 40 and other electronic circuitry.

FIG. 3 is a top right perspective view of a vertical extension 32 of a clamp in accordance with embodiments of the invention. Vertical extension 32 attaches to clamp 34 with a nut and bolt 35 extending through a corresponding bore 33 in vertical extension 32 and clamp 34. This figure also shows the slot 50 that is used to hold the housing 12 securely to the clamp 34. FIG. 4 is a top view of a slot 30 molded into a housing 12 of an automatic jigging device in accordance with one embodiment of the invention. The flange 54 engages the slot 50 to lock the housing to the clamp 34.

FIG. 5 is a circuit diagram of the circuit 60 that is used in embodiments of the automatic jigging device. The circuit 60 has a motor control pod 62 shown as a variable resistor. One end of the variable resistor 62 is connected to a power supply 63. The other end is connected to an electronic switch 64, shown as an n-channel MOSFET transistor. However, other controllable switches may be used. The switch 64 is connected to a motor 66 that is connected to ground 68. A terminal of resistor 70 is connected between the resistor 62 and the switch 64. A second terminal of resistor 70 is coupled to a positive 72 input of a comparator 74. The negative input 76 of the comparator 74 is coupled to a threshold voltage 76. The threshold voltage is set by the sensitivity control 37. The output 78 is coupled to a controller 80. The controller 80 includes a timer 82. The controller 80 has an output 84 connected to the control terminal of the controllable switch 64. A second output 86 of the controller 80 is coupled to a first alarm 88. A third output 90 is coupled to a second alarm 92. Note that the first alarm and the second alarm may be a speaker, which is driven by a different signal to form the first and second alarm. In at least some variations, a fourth output 94 is coupled to an RF transmitter 96 or transceiver. The transmitter/receiver 96 is coupled to an antenna 98. A Personal Digital Assistant (PDA) 100 can receive the signal through an antenna 102 coupled to a receiver (transceiver) 104. Note that the PDA can be a cell phone, a computer or any RF device. The PDA 100 can receive the alarm messages from the jigger device 10.

The comparator 74 acts as a current detector. When the motor 66 is stopped it draws considerably more current than when it rotating. As a result, the voltage at the node between the motor 66 and the variable resistor 62 drops. This drop in voltage is detected by the comparator 74 which causes the output 78 to go high. The controller 80 detects this change in the signal. Once the controller 80 has detected the change in the signal 78, it triggers alarm one 88 and may send a message to the PDA 100 using the transmitter 96. In addition, the controller 80 starts a timer 82. If the signal 78 stays high for predetermined period of time, which may be five seconds in one embodiment, the controller 80 triggers the second alarm 92 and may turn off the first alarm 88. The controller 80 may also message the PDA 100. In addition, the controller 80 signals 84 the electronic switch 64 to open, which turns off the motor 66. This saves power and keeps the motor 66 from overheating. This starts a second clock. When the second clock exceeds a certain period of time, which may be 15 seconds in one embodiment, the controller 80 signals the switch 64 to close. This starts the process over. The first alarm 88 tells the user that their fishing pole had a strike. The second alarm 92 tells the user that a fish is on the line. This automatic jigging device alerts the user by a light, audio alarm, spoken word, text message, or graphical user interface, that a fish is on their line, protects the motor and draws less power than prior art devices. As a result, the device only requires normal AA-cells (or other cells in a common size) batteries and will operate for many hours on a single set of batteries. Note that variations can be configured to operate using other power sources such as via an AC adapter or by way of a cigarette lighter.

Figure 6:
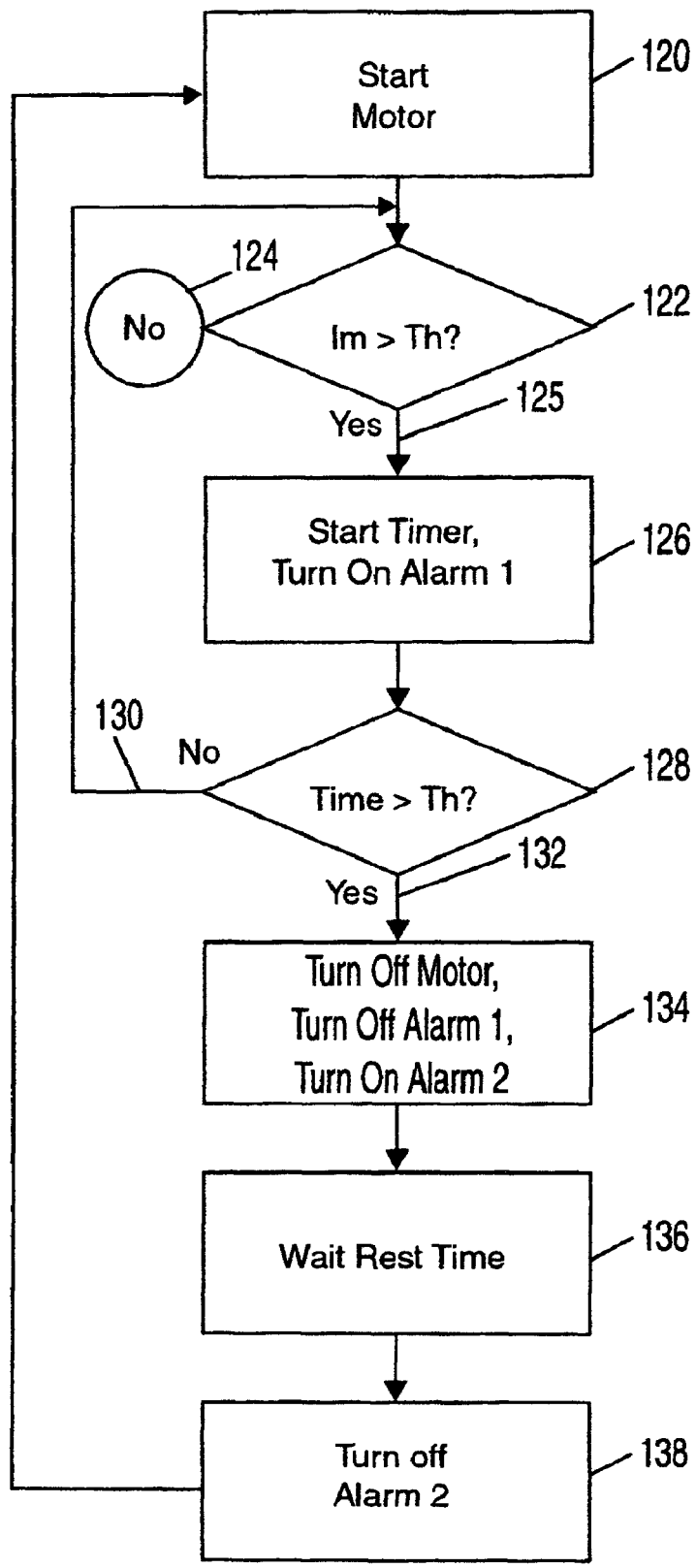
FIG. 6 is a flow chart of the steps used in operating an automatic jigging device in accordance with one embodiment of the invention.

FIG. 6 is a flow chart of the steps used in operating an automatic jigging device in accordance with embodiments of the invention. The process starts by starting the motor 120. Next, it is determined if the motor current (Im) is greater than a threshold (Th) at step 122. If the motor current (Im) is not greater than a threshold 124 the processes continues to check this parameter. When the motor current (Im) is greater than a threshold 125, a timer is started and a first alarm is triggered at step 126. Next, it is determined if the time that that the motor current has exceeded the threshold has exceed a predetermined period of time at step 128. When the time has not exceed a predetermined period of time 130 then the process returns to step 122. When the time has exceed a predetermined period of time 132, the motor and alarm one are turned off and alarm two is triggered at step 134. Next the process waits for a rest period at step 136. Once the rest period is up, alarm two is turned off at step 138. Next, the process returns to step 120 and the motor is turned on.

Interchangeable Cams According to One or More Embodiments of the Present Invention Automatic jigging machines including the one illustrated in relation to FIGS. 1 & 2 and prior art jigging machines operate to move a fishing rod usually through a holder up and down in a predetermined fashion. With jigging devices, such as embodiments of jigging devices illustrated herein, that utilize a cam 24, variations in the cams radius relative to a rotational axis acting upon a follower of the holder that is biased and/or gravitationally held against the cam, such as follower flange 26, cause the holder to move upwardly and downwardly. The speed of the movement and the frequency at which the predetermined pattern is repeated is controlled by the rotational speed of the cam and consequently the motor. As is intuitively obvious, one rotation of the cam comprises a jigging cycle of the holder and any fishing rod held therein. The movement of the rod holder and the fishing rod are translated along the fishing line to a hook or lure at the line's end located in a body of water. It is the movement of the lure facilitated by the jigging motion that attracts the attention of fish and subsequently entices the fish to strike the lure; however, uniform up and down movement of a lure as is typical in many prior art devices may in many instances fail to attract fish and in some cases may even cause them to shy away from the lure or bait.

Figure 7:
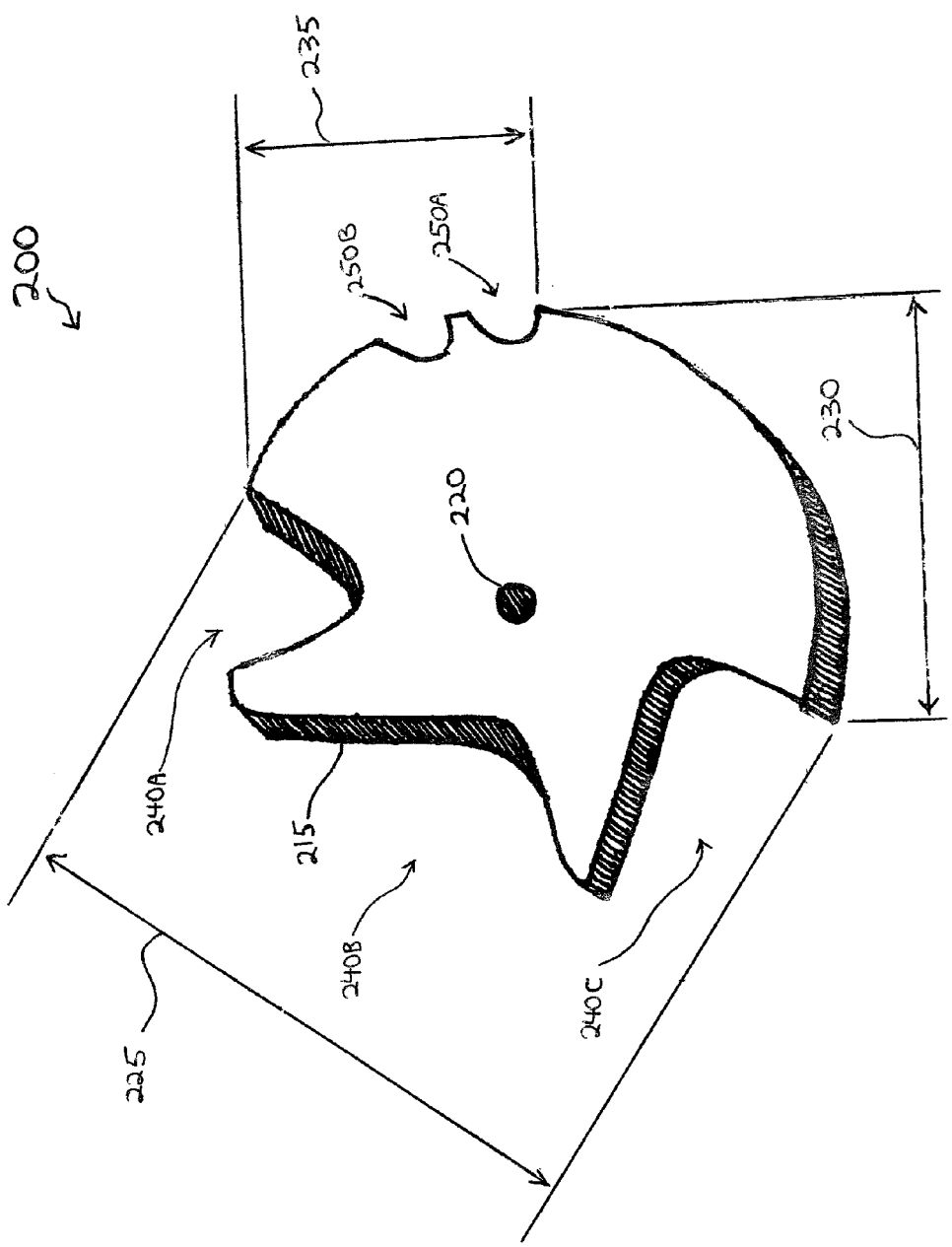
FIG. 7 is an isometric view of a cam for an automatic jigging device designed for use when fishing for active-type fish according to one embodiment of the present invention.
Figure 8:
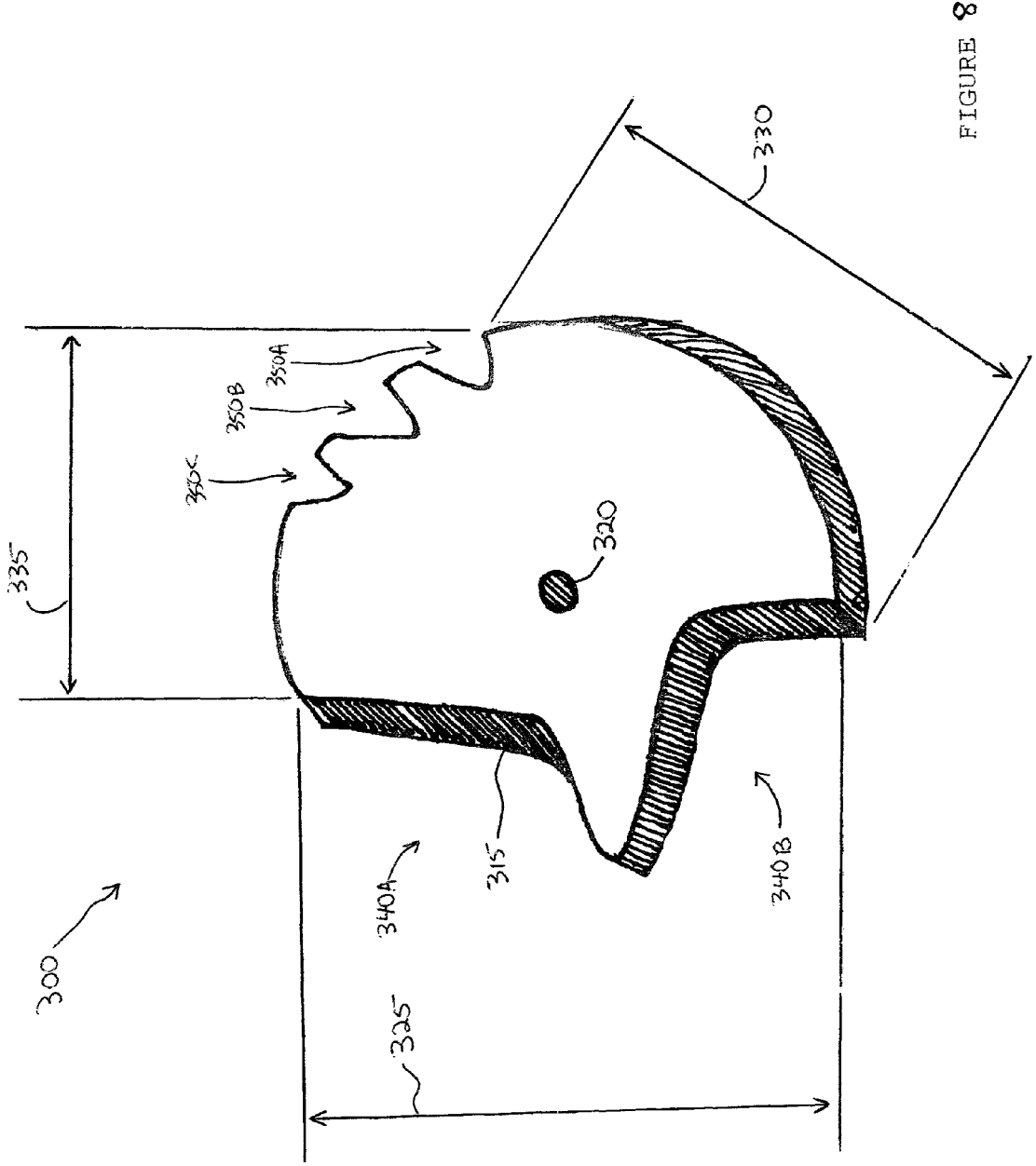
FIG. 8 is an isometric view of a cam for an automatic jigging device designed for use when fishing for passive-type fish according to one embodiment of the present invention.
Figure 9:
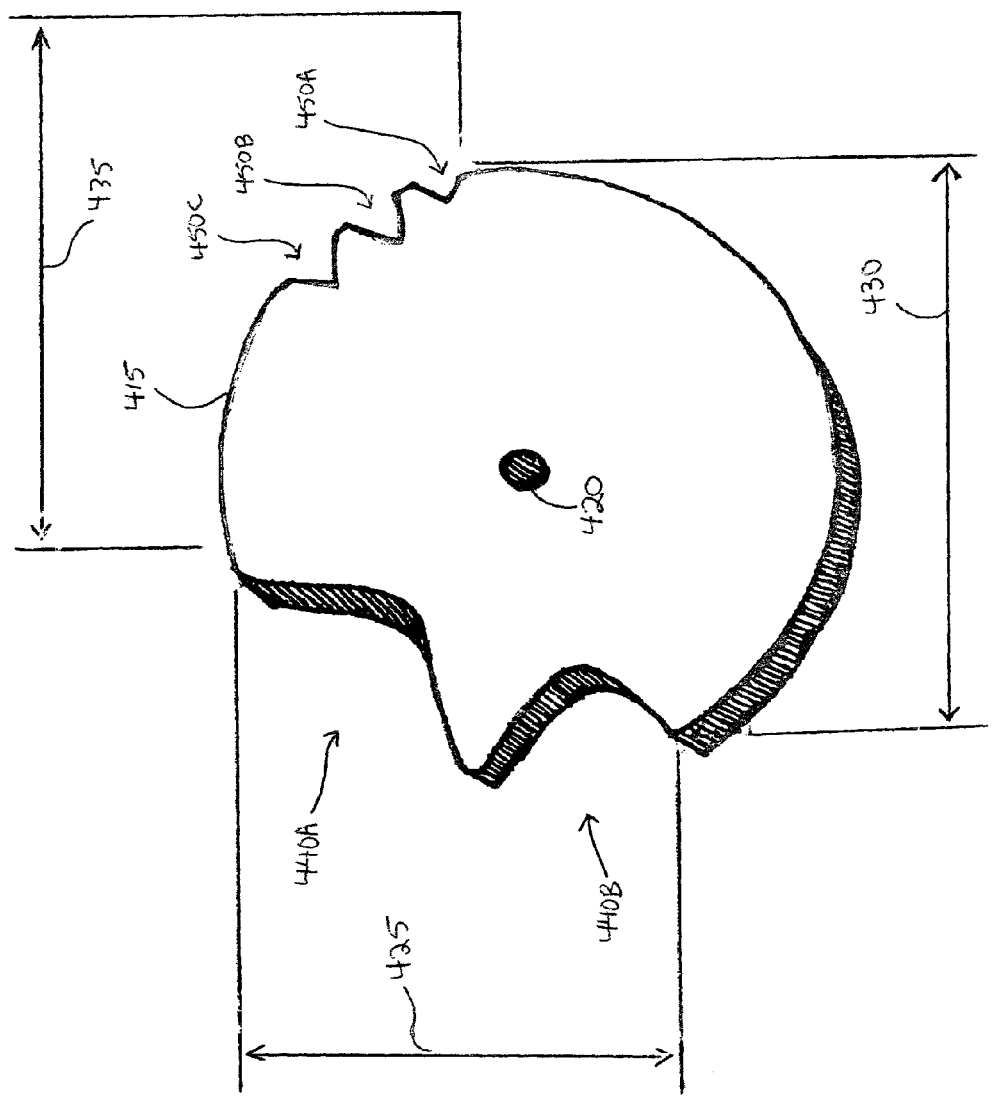
FIG. 9 is an isometric view of a cam for an automatic jigging device designed for use when fishing for negative-type fish according to one embodiment of the present invention.

Referring to FIGS. 7-9, cams having configurations that cause the lure to be jigged in a non-uniform fashion are illustrated. Each of these cams configured to jig a lure in a manner that is based fish psychology and fish behavior with the intent to attract certain types of fish under certain conditions.

According to Paul Johnson, author of Scientific Fishing, and Al Linder, Doug Stange and Dave Genz; authors and editors of In-Fisherman magazine Fish can be divided into several psychological and emotional types. Each type has different behavioral habits when it comes to striking lures or bait. A first type of fish is very aggressive and is drawn to fast deep jigging actions of a lure or bait. Some types of fish that fall into this category include Lake Trout, Pike, Muskie, Turbot, and Splake. Once the active fish has been aroused and attracted by the fast jigging movement; it moves in for a closer look to identify if the object is edible. If the lure or bait continues to jerk up and down at a fast pace, active fish tend to be frightened away and do not strike and unidentified lure or bait. If, however, the lure stops moving for a brief time, pauses, and allows the predator fish to look over the potential meal, a strike may be eminent as anticipation overcomes the fish. In this situation, the very next movement of the lure or jig will often trigger a fish strike.

The cam 200 illustrated in FIG. 7 is configured to take advantage of the psychology of active fish and provide a jigging cycle that includes three distinct phases or stages designed to maximize the probability that the jigging motion of an automatic jigger such as is illustrated in FIGS. 1 & 2. This cam and other cams described herein in reference to FIGS. 8 & 9 all generally comprise disks having front and rear faces 205 that are typically flat and spaced apart by the thickness 210 of the disk along a generally circumferential edge 215. It is the edge which the follower flange 26, and more specifically the follower's roller 28, rides against thereby moving the holder 14 and an associated rod upwardly and downwardly during the cams rotation.

A mechanism for mounting the cam 200 to the shaft of the jigger motor is provided at a nominal center thereof that defines the axis of rotation of the cam. As illustrated, the illustrated mechanism comprises a hole 220 through which a screw is passed and secured to the motor shaft. In other variations, a shaft can protrude from the center that is received into a bore in the motor shaft. In yet other variations, a collar may protrude from the center that slides over the shaft. The hole may be cylindrical of it may have an non-cylindrical shape that mates with a similar shape of the shaft to fixedly hold the cam relative to the shaft such that the cam will not slip during operation of the motor. It is appreciated that the particular mechanism of securing the cam to the shaft can vary substantially as would be obvious to someone of ordinary skill given the benefit of this disclosure.

The edge of the cam 215 comprises a series of indentations 240a-c & 250a-b that cause the holder to first fall then rise multiple times during a 360 degree rotation of the cam, which comprises a single repeatable jigging cycle. Unlike the motion imparted by most prior art automatic jiggers, the cam facilitates moving the holder upwardly and downwardly in a series of non-uniform motions specifically designed to attract active fish. The depth of any indentation controls the total magnitude of holder and rod movement associated with the indentation. The initial downward slope of an indentation determines the rate of fall of the holder and rod while the upward slope of the indentation controls the rise of the holder and rod. The rise and fall for any indentation need not be similar. In the associated figures, the cams are configured to rotate in a clockwise direction wherein the right slope of any indentation when facing upwardly is the downward slope and the left slope is the upward slope, although variations are contemplated where the configuration of the cam is reversed for counterclockwise rotating shafts.

The circumferential edge 215 of the cam 200 is divided into three basic sections that correspond to different stages (or phases) of an active fish jigging cycle: an attractor phase 225; a pause/trepidation stage 230; and a strike phase 235. During the attractor stage, the cam moves holder 14 and rod up and down in deep quick strokes as caused by a series of deep indentation 240a-c. Next, during the pause/trepidation stage, the cam does not have any indentations and the edge at any point during this phase is generally located a similar radial distance from the axis of rotation such that the holder/rod and associated lure is held generally stationary. After the pause/trepidation stage, the strike phase follows with a series of small upwardly and downwardly movements facilitated a corresponding series of shallow indentations 250a-b in the cam. In typical use, a jigger incorporating an active fish cam 200 is configured to complete a jigging cycle every 10-30 seconds, more preferably every 10-20 seconds and most preferably every 10-12 seconds, although other cycle times can be used as well.

By employing the movements dictated by the various cam stages, the active fish cam facilitates more strikes on the bait by active type fish than prior art automatic jigging devices that move the bait or lure up and down in a regular and predictable manner. Based on experiments performed by the inventor, an angler's catch is estimated to be up to 10 times greater using the forgoing strategy than by "dead sticking" or using a monotonous jigging pattern.

Still referring to FIG. 7, the specific configuration of the various stages and associated indentations are described. The first indentation 240a of the attractor stage 225 has an angle of incidence of about 30-40 degrees wherein 360 degrees represents a complete rotation of the cam (or a jigging cycle). The indentation has a depth of about 45-55% of a radial line extending from the axis of rotation to a point on the circumference of the smallest circle that could fully circumscribe the cam. The amount of movement that such an indentation would cause at the end of an associated rod (and an associated lure depending also on the angle of the line relative to the rod's end) depends on several factors, such as the location of the cam relative to the rod, the length of the rod, and the length of the cam. Preferably, a movement of about 10-20 inches, more preferably 12-18 inches and most preferably 15-18 inches is desired at the tip of the rod relative to the first indentation as well as the other indentations in the attractor stage portion, although embodiments outside of these ranges are also contemplated.

The second indentation 240b has a depth of about 55-65% but also has a more gentle downward slope causing the rod tip and the associated lure/bait to descend much more slowly. The incidence of the second indentation is about 80-90 degrees.

The third and final indentation 240c of the attractor stage has a depth of about 45-55% but with a downward slope generally between the first and second indentations causing the rod tip and the associated lure/bait to descend at a moderate rate relative to the other two indentations. The incidence of the second indentation is about 50-60 degrees resulting in the attractor phase having a total incidence of about 180 degrees of half of the cycle.

The pause/trepidation phase 230 has an incidence of about 90-100 degrees or so. As mentioned above, the entire length of the edge in this phase is located a common radial distance from the axis of rotation such that the tip of the associated fishing rod is held generally stationary and any movement of the lure/bait is during this phase is caused primarily by water currents.

The strike phase 235 comprises a pair of similar shallow indentations 250a-b designed to entice the active-type fish into biting. Each of these indentations have an incidence of about 10-20 degrees and depth of about 10-20% and the second indentation 250b closely follows the first indentation 250a. After the indentations, the cam surface is indentation free and as such the lure/bait is held generally stationary for a period of time where after the cycle is then repeated. However, if a fish was in the area of the lure/bait and observed the bait during the jigging cycle and the automatic jigging machine 10 described above is used in conjunction with the cam 200, the fish may have struck the lure/bait and accordingly, the alarm will sound to notify the fisherman.

A second category of freshwater fish is classified as passive. Passive (or neutral) fish are not as aggressive as active fish but more calculating and measured in their biting habits. Fish in this category include: Crappie, Large Mouth and Small Mouth Bass, Blue Gill, All Stream Trout, Perch and Grayling. Like active fish, passive fish ascribe to the same sequence of actions (stages or phases) to provoke them to strike: Jigging to attract or entice (the attractor phase), stopped motion to allow the bait or lure to be inspected (the pause/trepidation phase), followed by a small jigging action to provoke a strike (the strike phase). The primary difference in the configuration of a passive fish cam 300 is that the first attractor jigging stage is less pronounced and not as long in duration and tempo. Further, the pause stage is longer. For this type of fish a longer amount of time is required to build a sense of anticipation in the fish. The strike phase can be just a quiver or a few short jigs. One embodiment of a cam 300 for passive fish is illustrated in FIG. 8.

Like the active fish cam, the circumferential edge 315 of the passive fish cam 300 is divided into three basic sections that correspond to the different stages (or phases) of the passive fish jigging cycle: an attractor phase 325; a pause/trepidation stage 330; and a strike phase 335. Specific characteristics of the various phases for the passive fish cam 300 differ somewhat from the characteristics of the various phases embodied in the active fish cam 200. During the attractor stage, the cam moves holder 14 and rod up and down in deep strokes that are slower than with the active fish cam as caused by a series of deep indentations 340a-b. Next, during the pause/trepidation stage, the cam does not have any indentations and the edge at any point during this phase is generally located a similar radial distance from the axis of rotation such that the holder/rod and associated lure is held generally stationary. After the pause/trepidation stage, the strike phase follows with a series of small upwardly and downwardly movements facilitated a corresponding series of shallow indentations 350a-c in the cam. In typical use, a jigger incorporating a passive fish cam 300 is configured to complete a jigging cycle every 10-30 seconds, more preferably every 20-30 seconds and most preferably every 25-30 seconds, although other cycle times can be used as well.

Referring to FIG. 8, the specific configuration of the various stages and associated indentations are described. The first indentation 340a of the attractor stage 325 has an angle of incidence of about 80-90 degrees. The indentation has a depth of about 50-60% of a radial line extending from the axis of rotation to a point on the circumference of the smallest circle that could fully circumscribe the cam. The larger angle of incidence facilitates a more shallow downward and upward slopes compared with some of the attractor phase indentations of the active fish cam specifically the first and third indentations 340a&c. Preferably, a movement of about 10-20 inches, more preferably 12-18 inches and most preferably 15-18 inches is desired at the tip of the rod relative to the first indentation as well as the other indentations in the attractor stage portion, although embodiments outside of these ranges are also contemplated.

The second indentation 340b also has a depth of about 50-60% and also has a relatively gentle downward slope similar to the first indentation 340a causing the rod tip and the associated lure/bait to descend more slowly than would be experienced with the first and third indentations 240a&c of the active fish cam but generally similar to the second indentation 240b of the active fish cam. The incidence of the second indentation is also about 80-90 degrees. The attractor phase 325 of the passive fish cam has total incidence of about 170 degrees with only two indentations.

The pause/trepidation phase 330 has an incidence of about 100-120 degrees or so. As mentioned above, the entire length of the edge in this phase is located a common radial distance from the axis of rotation such that the tip of the associated fishing rod is held generally stationary and any movement of the lure/bait is during this phase is caused primarily by water currents.

The strike phase 335 comprises a trio of similar shallow indentations 350a-c designed to entice the passive-type fish into biting. Each of these indentations have an incidence of about 10-15 degrees and depth of about 25-35% with the third indentation 350c closely following the second indentation 350b, which closely follows the first indentation 350a. Similar to the active fish cam 200, after the indentations, the surface of the passive fish cam 300 is indentation free and as such the lure/bait is held generally stationary for a period of time where after the cycle is then repeated. However, if a fish was in the area of the lure/bait and observed the bait during the jigging cycle and the automatic jigging machine 10 described above is used in conjunction with the cam 300, the fish may have struck the lure/bait and accordingly, the alarm will sound to notify the fisherman.

The last type of behavioral pattern of fish biting habits is the negative fish. All fish can fit into this category from time to time depending on various environmental conditions. If a fish is satiated on bait fish, being negatively affected by barometric pressure changes, the lunar pull, or temperatures conditions as well as other environmental stimuli, it may be have in a negative manner relative to striking or biting a lure or bait. Accordingly, fish in this category are hard to catch. However, fish in this category will often respond to a short slow jigging and long pauses with slight quivering motions at the end of a jigging cycle. The negative fish cam 400 as illustrated in FIG. 9 is the cam a fisherman can utilize when none of the other two cams are being effective and the fisherman know there are fish in the area of the automatically jigged rod. The negative fish cam 400 has a low profile sculpted look with relatively shallow attractor phase indentations that cause a slight up and down motion of the lure, bait, jig or spinner. The attractor phase is followed by a very long pause/trepidation phase substantially similar to the pause/trepidation phases described above save for length. Finally, two or more slight and shallow jigs or quivers of the lure are applied in the strike phase to entice the negative fish to bite.

Like the other fish cams, the circumferential edge 415 of the negative fish cam 400 is divided into three basic sections that correspond to the different stages (or phases) of the negative fish jigging cycle: an attractor phase 425; a pause/trepidation stage 430; and a strike phase 435. Specific characteristics of the various phases for the negative fish cam 400 differ somewhat from the characteristics of the various phases embodied in the other fish cams 200&300. During the attractor stage, the cam moves holder 14 and rod up and down in relatively shallow strokes that are faster than with the passive fish cam as caused by a series of indentations 440*a-b*. Next, during the pause/trepidation stage, the cam does not have any indentations and the edge at any point during this phase is generally located a similar radial distance from the axis of rotation such that the holder/rod and associated lure is held generally stationary. The pause/trepidation phase in the negative fish cam is the longest of the three cams. After the pause/trepidation stage, the strike phase follows with a series of small upwardly and downwardly movements facilitated a corresponding series of shallow indentations 450*a-c* in the cam. In typical use, a jigger incorporating a negative fish cam 400 is configured to complete a jigging cycle is configured to complete a jigging cycle every 10-30 seconds, more preferably every 20-30 seconds and most preferably every 25-30 seconds, although other cycle times can be used as well.

Referring to FIG. 9, the specific configuration of the various stages and associated indentations are described. The first indentation 440*a* of the attractor stage 425 has an angle of incidence of about 50-60 degrees. The indentation has a depth of about 35-45% of a radial line extending from the axis of rotation to a point on the circumference of the smallest circle that could fully circumscribe the cam. The downward slope of the first indentation is relative shallow compared with its upward slope. Preferably, a movement of about 10-20 inches, more preferably 12-18 inches and most preferably 15-18 inches is desired at the tip of the rod relative to the first indentation as well as the other indentations in the attractor stage portion, although embodiments outside of these ranges are also contemplated.

The second indentation 440*b* also has a depth of about 35-45% but its downward slope is steeper than that of the first indentation 440*a*. The incidence of the second indentation is about 40-50 degrees. The attractor phase 425 of the passive fish cam has total incidence of about 100 degrees with two indentations.

The pause/trepidation phase 430 has an incidence of about 160-180 degrees or so. As mentioned above, the entire length of the edge in this phase is located a common radial distance from the axis of rotation such that the tip of the associated fishing rod is held generally stationary and any movement of the lure/bait is during this phase is caused primarily by water currents.

The strike phase 435 comprises a trio of similar very shallow indentations 450*a-c* designed to entice the negative-type fish into biting. Each of these indentations have an incidence of about 10-15 degrees and depth of about 10-20% with the third indentation 450*c* closely following the second indentation 450*b*, which closely follows the first indentation 450*a*. Similar to the other fish cams 200&300, after the indentations, the surface of the negative fish cam 400 is indentation free and as such the lure/bait is held generally stationary for a period of time where after the cycle is then repeated. However, if a fish was in the area of the lure/bait and observed the bait during the jigging cycle and the automatic jigging machine 10 described above is used in conjunction with the cam 200, the fish may have struck the lure/bait and accordingly, the alarm will sound to notify the fisherman.

It is to be appreciated that the specifications provided concerning the stages and the indentations provided above for the various types of cams are intended to be exemplary and that variations are contemplated that vary from the above specifications but still divide the cams into a plurality of stages intended to utilize fish psychology and behavior to entice fish to strike an associated lure or bait when used with an automatic jigger. As described in detail above the stages or phases that each cam incorporates includes: (i) an attractor stage at which time a fish is drawn to the lure by a particular jigging action; (ii) a pause/trepidation stage that entices the fish to come closer and builds predator confidence to approach the bait or lure; and (iii) a strike stage that follows the pause/trepidation stage and is characterized by a hard or soft jig or quiver of the lure or bait.

In some embodiments of the automatic jigging device, a blank cam is provided. Specifically, the cam comprises a circular disk comprised of a plastic material with a mechanism for attaching the can to the automatic jigging device. A user can carve a jigging pattern of his/her design. For instance, a fisherman might have developed a particular manner of jigging his rod when fishing in the traditional manner at a favorite fishing spot. Using the blank cam, the fisherman can tailor the cam to match his personal jigging style by whittling out indentations in the disk or grinding away material to form the indentations such as with a Dremel™-type tool.

A Fishing Rod Holder According to One or More Embodiments of the Present Invention Embodiments of a single piece rod holder are described herein and illustrated in FIGS. 10-15. Embodiments of the rod holder permit anglers to effectively lock their rods in the rod holder against axial loads (i.e. loads applied along the axis of a fishing rod received in the holder) without the use of additional moving or latching parts. Embodiments of the rod holder typically comprise cylindrical tubular pieces of plastic or metal that are available in different diameters and lengths depending factors such as the type of type of fish being sought and size of the rod being used. However, the angler can lock their rod and reel into the holder and pull it back out with the flick of the wrist. Some embodiments of the rod holder are designed to articulate on a conventional rod holder base. Whereas, other embodiments incorporate follower flanges 26 and attachment flanges 25 that facilitate the use of the holder in conjunction with the aforementioned automatic jigging device. Yet other embodiments are contemplated having any suitable connectors for coupling with any type of jigging device or rod holder mounting base.

Figure 10:
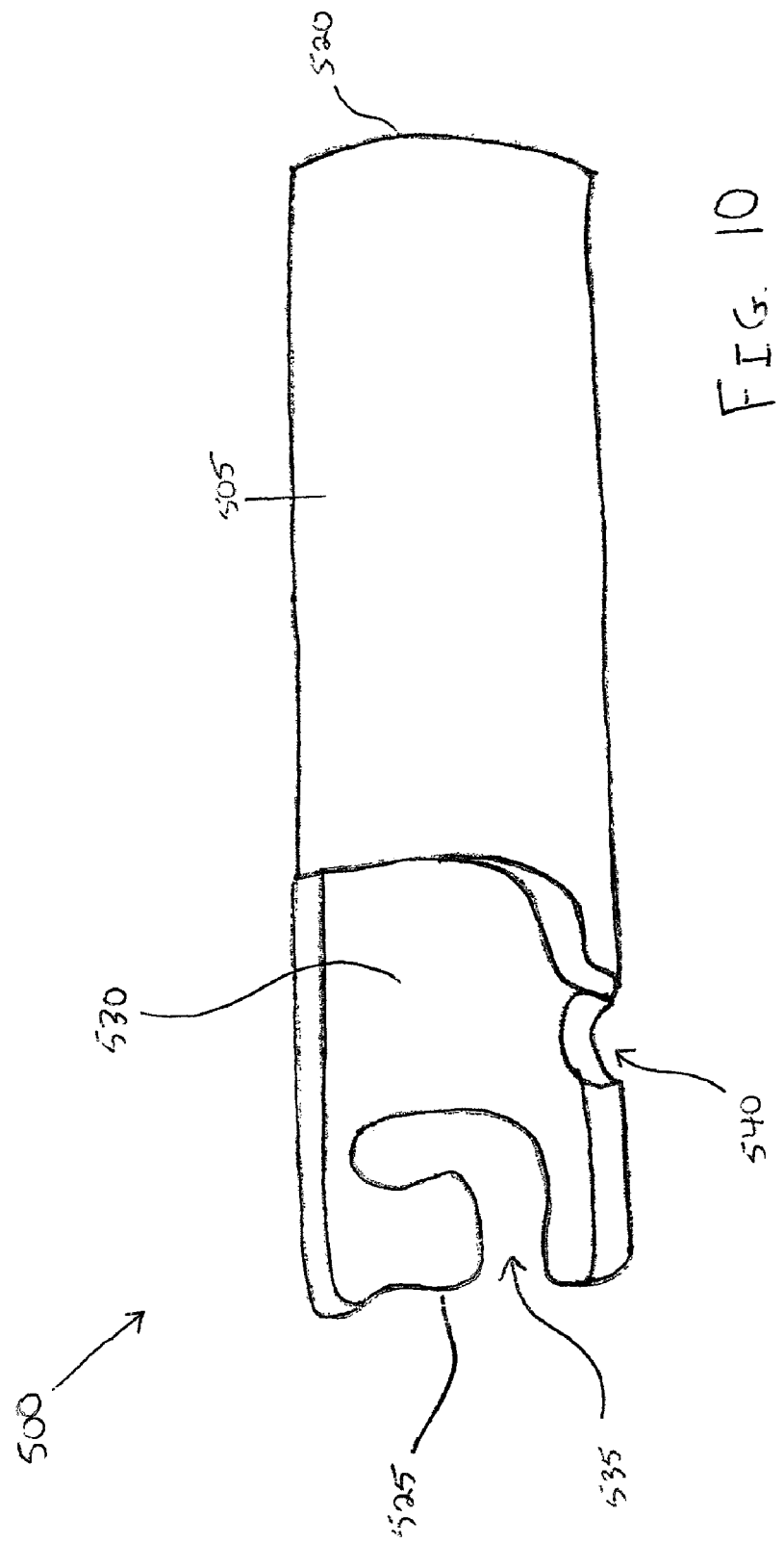
FIG. 10 is an isometric top view of a fishing rod holder according to one embodiment of the present invention.
Figure 11:
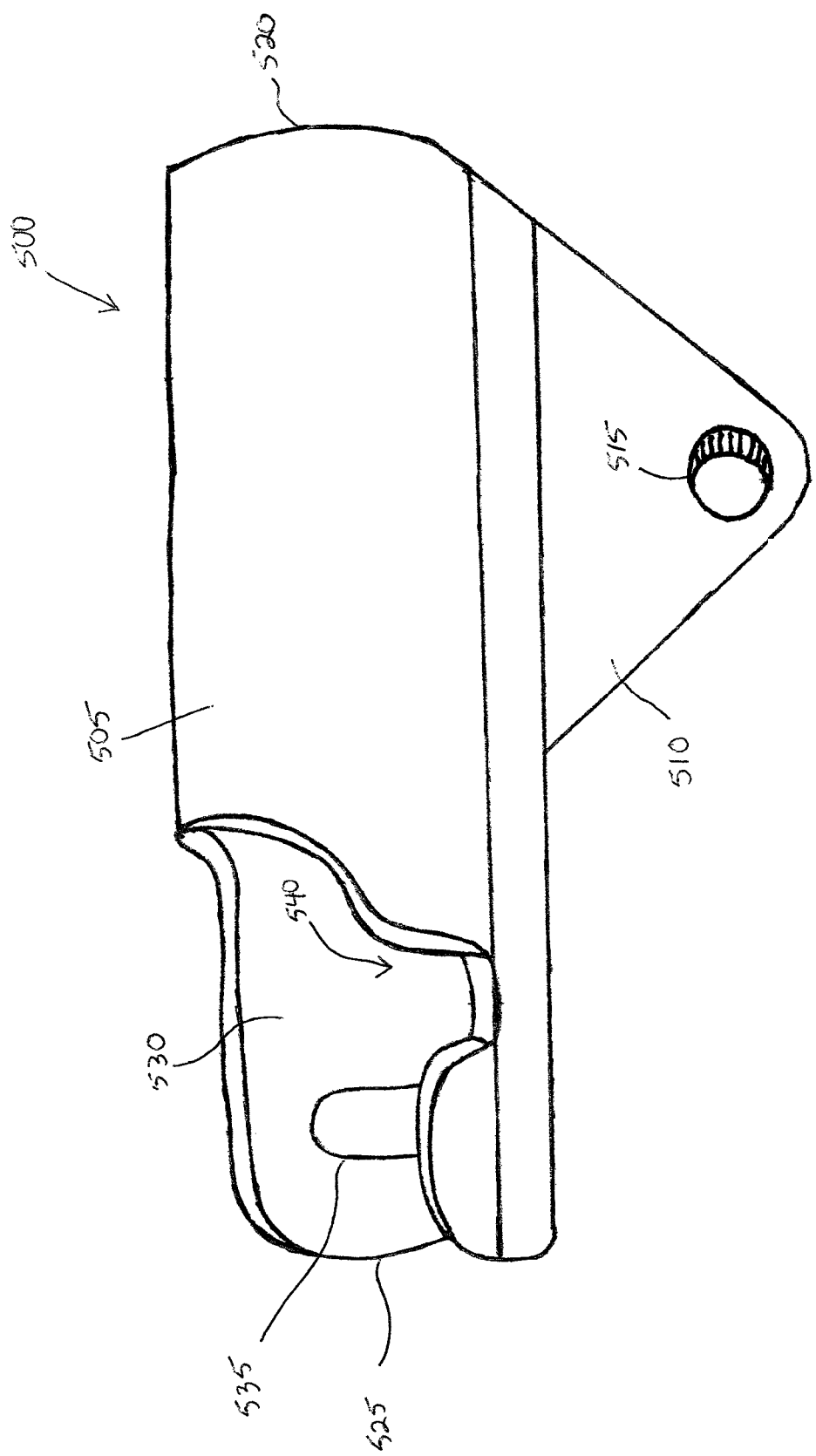
FIG. 11 is an isometric side view of the fishing rod holder of FIG. 10 according to one embodiment of the present invention.
Figure 12:
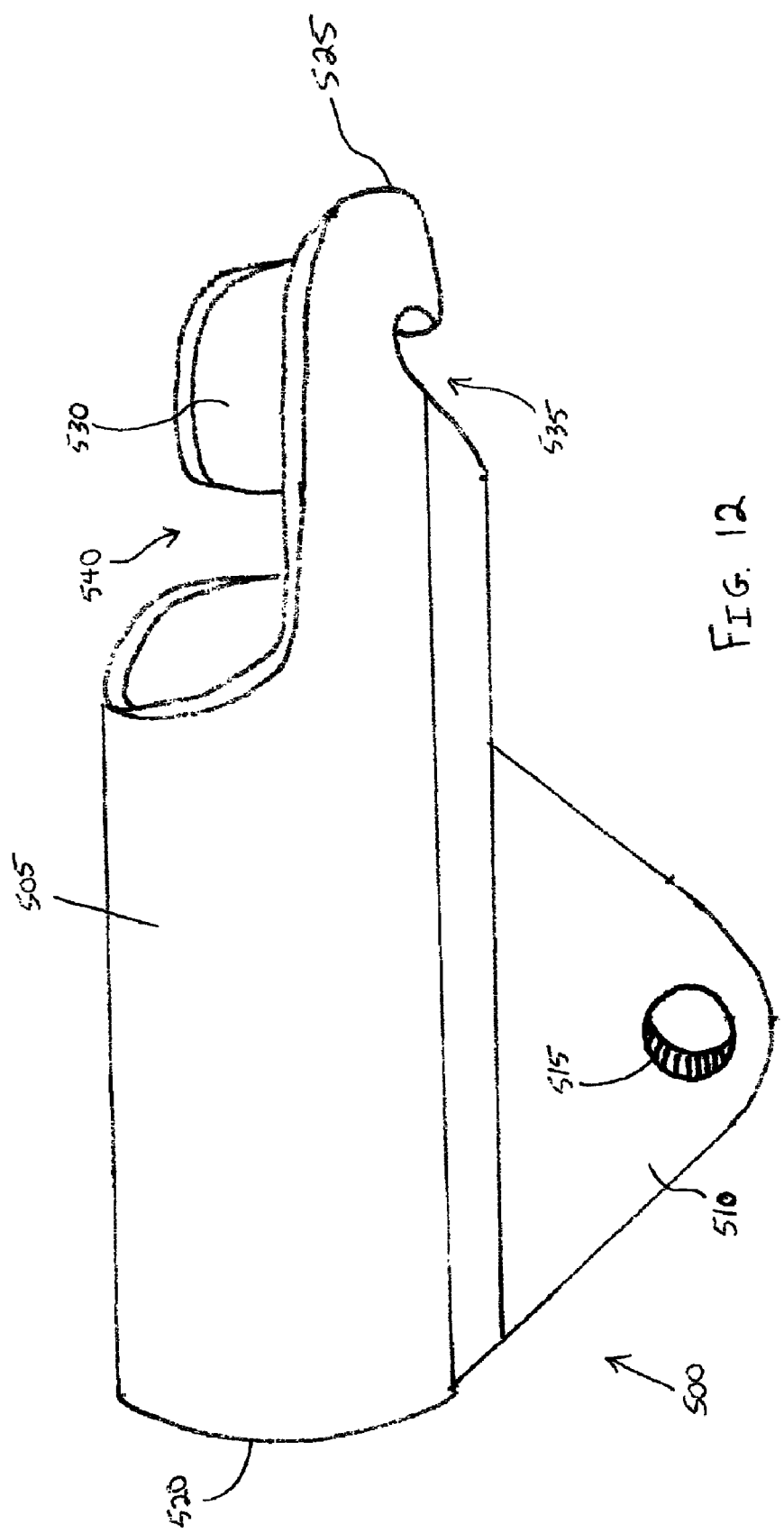
FIG. 12 is an opposing isometric side view of the fishing rod holder of FIG. 10 according to one embodiment of the present invention.

Referring primarily to FIGS. 10-12, the illustrated embodiment of the rod holder 500 comprises a cylindrical and tubular body 505 defining a longitudinal axis of the holder. The length of the body can vary. A mounting flange 510 or flanges extending generally downwardly from a bottom portion (or side) of the tubular body. Typically, the flange(s) is integral with the body, such as when the entire unit is molded in a single piece; however, in some variations, the flanges may be attached to the body by other means such as adhesive boning, welding or mechanical attachment. The flange(s) typically includes at least one opening/hole 515 for attaching the holder to a base or mounting bracket, although the specific configuration of the flange to facilitate mounting can vary substantially from embodiment to embodiment. While a single flange is illustrated in the figures, it is appreciated that multiple flanges may be provided such as flanges similar to flanges 25&26 described above in reference to the holder 14 illustrated in conjunction with the automatic jigging device 10.

Figure 13:
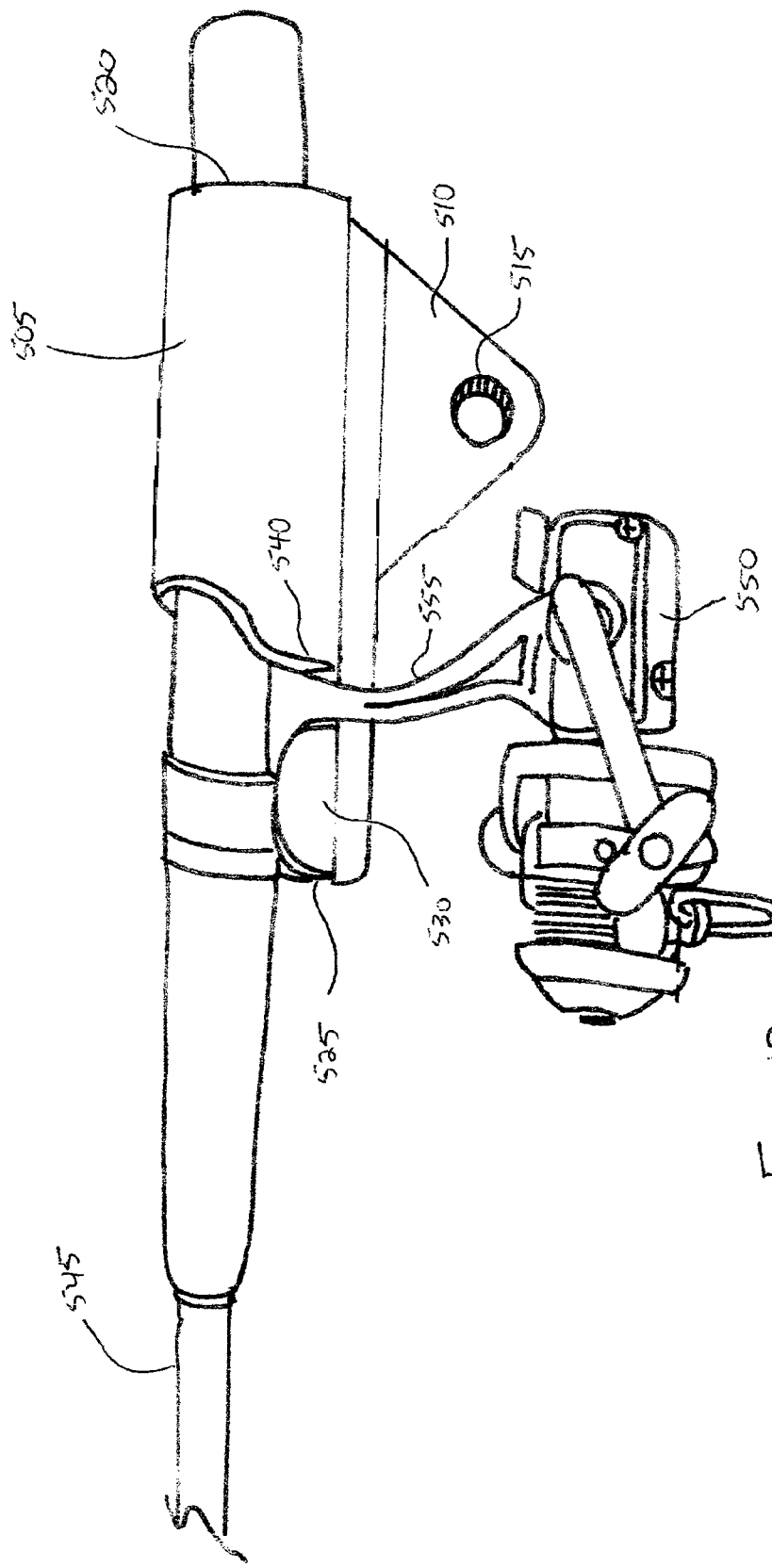
FIG. 13 is an isometric side view of the fishing rod holder of FIG. 10 with a rod and open faced spinning reel combination lockably received therein according to one embodiment of the present invention.

The proximal end 520 of the body is typically open to permit the handle end of a fishing rod to pass therethrough as best shown in FIG. 13. The opposing distal end 525 of the body includes only an arcuate portion 530 comprising the bottom 180 degrees of the cylindrical tube as the remainder of the body is removed or cutaway. It is appreciated that while the missing portion of the tubular body proximate the distal end is referred to as being removed or cutaway, this need not be the case in terms of the body's manufacture. In other words, the body can be molded in the particular illustrated shape without any portion of the tube that comprises the body having been cutaway or removed.

The arcuate portion 530 extends inwardly from the distal end 525 a couple of inches or more depending on the dimensions of the holder. A pair of slots 535&540 utilized to lock/secure different types of rod and reel combinations in place in the holder extend inwardly into the arcuate portion. The first slot 535 comprises an L-shaped slot that extends first axially inwardly from the distal end of the arcuate portion along the body's bottom side and then turns about 90 degrees and extends circumferentially a distance before terminating. The L-shaped slot is adapted to receive a finger rest element of a pistol grip fishing rod therein. The second slot 540 extends circumferentially downwardly from a generally axially extending side of the arcuate portion 530 at a location typically but not necessarily 1.5-2.5 inches from the distal end 525. The second slot terminates at the bottom side/portion of the body. The second slot is adapted to lockably receive the shank of an open faced spinning reel when the coupled and associated rod is received into the holder body.

FIG. 13 illustrates a rod 545 with an open faced spinning reel 550 lockably received into an embodiment of the holder 500 by way of the second slot 540. To lock in an open faced reel and associated rod into the holder, the angler places the butt of the spinning rod into the tubular portion of the holder until the shank 555 of the reel is aligned axially with the second slot. Next, the angler drops the shank into the slot and rotates the spinning reel downwardly until the shanks butts up against the end of the slot with the spinning reel on the top and port side of the rod holder. When secured in this manner, axial loading of the rod, such as through the fishing line will cause the shank to butt against the side of the second slot preventing the rod and reel from sliding out of the holder. Furthermore, the butt of the rod is housed in the fully tubular portion of the holder and if a hooked fish pulls the tip of the rod downwardly, the butt of the rod wedges against the top of the inside of the rod holder thereby preventing the rod from being pulled out of the holder by a hooked fish. To remove the open faced reel and rod combination, an angler merely reverses the above process or rotates the shank out of the slot and then pulls the butt of the rod generally axially to free it from the holder. The removal process does not require the manipulation of extraneous pieces, such as lock rings, and as such can be accomplished very quickly to facilitate the setting of the hook before the fish can spit out the hook.

Figure 14:
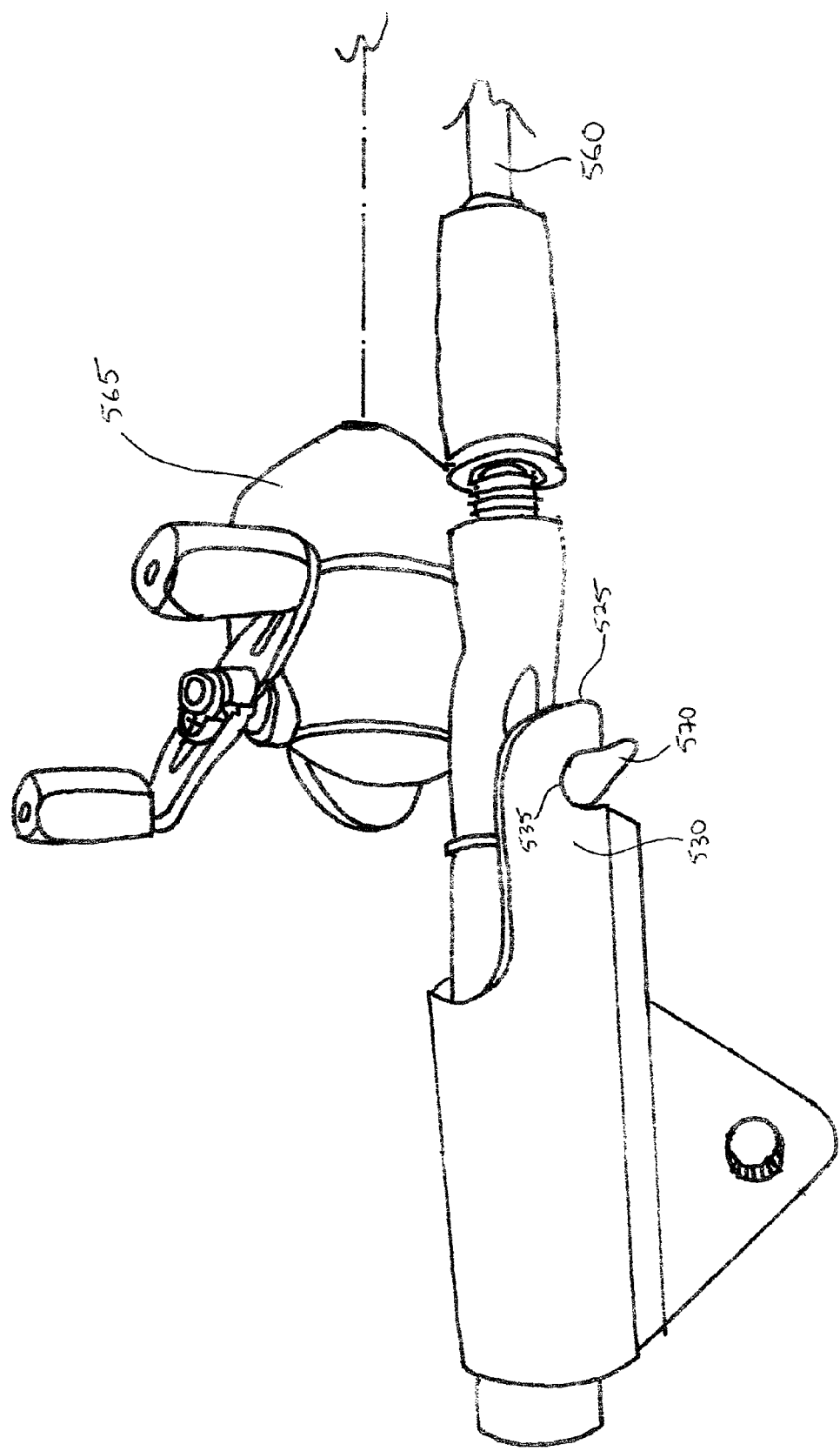
FIG. 14 is an isometric side view of the fishing rod holder of FIG. 10 with a pistol grip rod and closed faced spinning reel combination lockably received therein according to one embodiment of the present invention.

FIGS. 14 & 15 illustrate a pistol grip rod 560 with its associated closed face reel 565 lockably received into an embodiment of the holder 500. To lock a pistol grip rod into the holder, the angler inserts the butt of the rod into the tubular portion of the holder until the finger hold 570 butts up against the distal end 525 of the holder. He/She then rotates the finger hold until it aligns with the first slot 535 whereby he/she slides the finger hold into the slot until it bottoms out. Next, the user rotates the rod to secure the finger hold in the foot of the L-shaped slot. Gravity acting on the reel which is mounted to the rod directly opposite the finger hold acts to hold the finger hold against the bottom of the slot. Once the rods pistol grip is in the pistol grip notch, it can not be removed until the angler reverses the procedure and pulls the rod out of the holder. The removal process does not require the manipulation of extraneous pieces, such as lock rings, and as such can be accomplished very quickly to facilitate the setting of the hook before the fish can spit out the hook.

OTHER EMBODIMENTS AND VARIATIONS

The various preferred embodiments and variations thereof illustrated in the accompanying figures and/or described above are merely exemplary and are not intended to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

I claim:
1. A fishing rod holder comprising:
a single unitary piece including:
a cylindrical tubular body portion defining a first radius and a longitudinal center axis, an end of the body portion defining a proximal end of the holder,
an arcuate portion extending from the body and having an angle of incidence of about 180 degrees, the arc of the arcuate portion having a similar radius as the first radius and having an axis coincident with the center axis, an end of the arcuate portion furthest from the body defining a distal end of the body,
a substantially L-shaped first slot extending inwardly in the arcuate portion from a first slot open end at the distal end of the body in a direction generally parallel with the center axis along a leg portion thereof and extending in a direction generally perpendicular to the center axis along a foot portion to a first slot closed end whereby the first slot is adapted to axially lockably receive the shank of an open faced spinning reel therein, and
a second slot extending in a generally circumferential direction from a second slot open end at a generally longitudinal edge of the arcuate portion to a second slot closed end whereby the second slot is adapted to axially lockably receive a finger hold of a pistol grip rod having a closed face reel mounted thereon.
2. The fishing rod holder of claim 1 further including one or more mounting flanges depending from the tubular body.

* * * * *